April 21, 1925.
G. FREY
PASSENGER CAR
Filed May 1, 1924    2 Sheets-Sheet 1
1,534,847
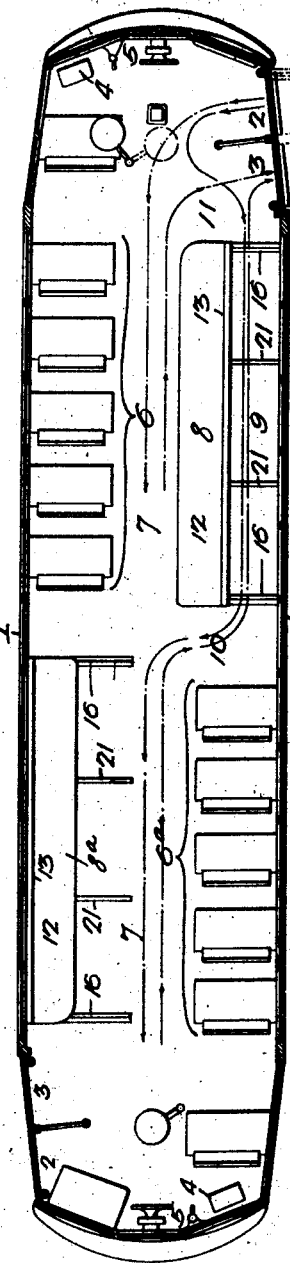
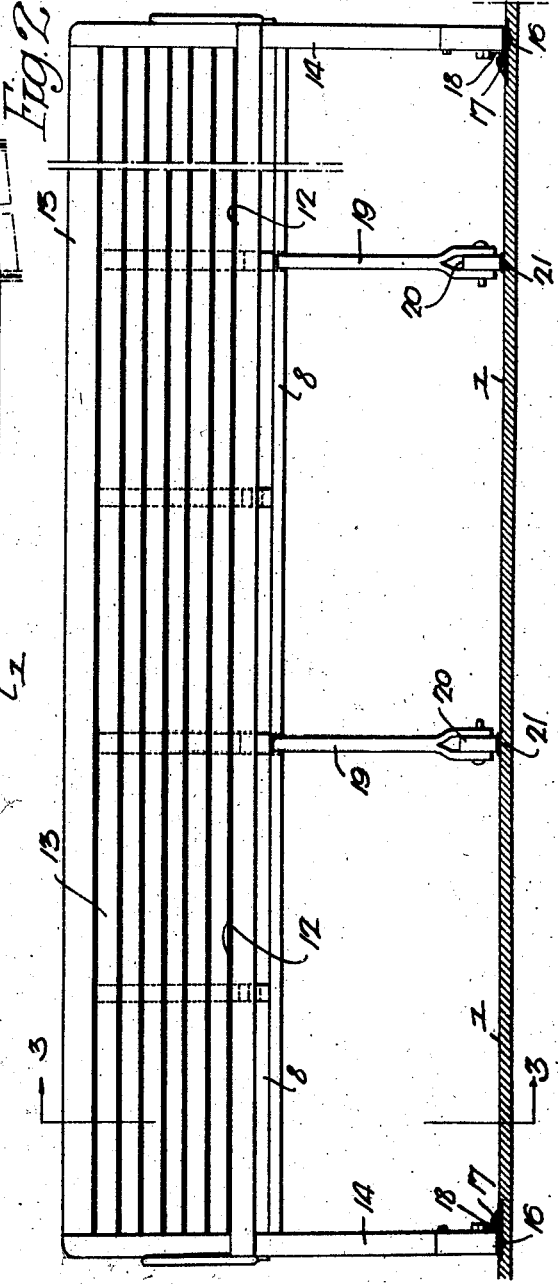
Inventor.
George Frey.
by his Attorneys.

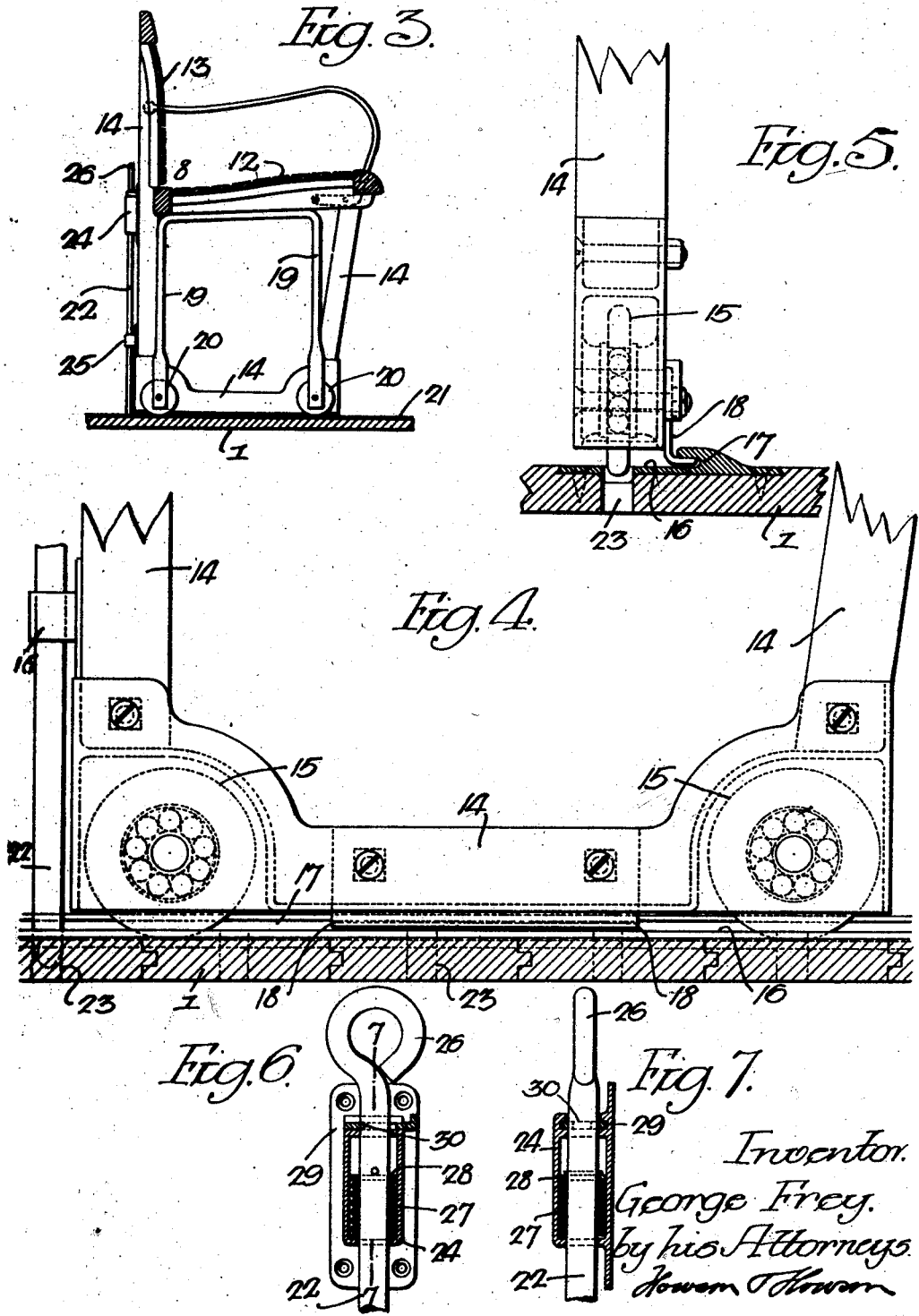

Patented Apr. 21, 1925.

1,534,847

UNITED STATES PATENT OFFICE.

GEORGE FREY, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

PASSENGER CAR.

Application filed May 1, 1924. Serial No. 710,346.

*To all whom it may concern:*

Be it known that I, GEORGE FREY, a citizen of the United States, residing in Philadelphia, Pennsylvania, have invented certain Improvements in Passenger Cars, of which the following is a specification.

My invention relates to certain improvements in passenger cars that are arranged to accommodate two classes of passengers.

One object of the invention is to arrange the seats of a passenger car so that two aisles are provided at one end of the car and a single aisle is provided at the opposite end of the car.

A further object of the invention is to construct a double end passenger car of the above type so that seat sections can be shifted to provide passageways at either end of the car.

A still further object of the invention is to design the car so that it can be readily converted into a one class car at any time desired.

The invention also relates to certain details described hereinafter.

In the accompanying drawings:

Fig. 1 is a sectional plan view of my improved passenger car;

Fig. 2 is a front elevation of one of the movable seat sections;

Fig. 3 is a sectional view of one of the movable seat sections taken on the line 3—3, Fig. 2;

Fig. 4 is an enlarged view showing the supporting wheels and track at one end of the seat;

Fig. 5 is a front view of the structure shown in Fig. 4;

Fig. 6 is an enlarged sectional view illustrating the construction of one of the bolts; and Fig. 7 is a sectional view on the line 7—7, Fig. 6.

1 is a passenger car of the trolley type, in the present instance, having an entrance doorway 2 and an exit doorway 3 at each end. It also has at each end a controller 4 and brake mechanism 5.

At one end of the car, and at one side thereof, is a series of transverse seats 6 extending to a centre aisle, or passageway, 7. At the opposite end, and opposite from the seats, are transverse seats 6ª.

Directly opposite the seats 6 and 6ª are longitudinal seat sections 8 and 8ª. These longitudinal seat sections are movable towards and from the sides of the car, so as to form a longitudinal passage 9 back of the seat section, or, to increase the width of the centre aisle 7, as clearly shown in Fig. 1. The movable longitudinal seat sections are shorter than the space between the transverse seats and the entrance and exit doors, to provide, on that side of the car having the passageway 9, clear passageways 10 and 11 at each end of the movable seat section.

The movable seat sections 8 and 8ª are made as shown in Figs. 2 to 5 and have seat portions 12 and back portions 13. The end frames 14 of each seat section have ball bearing wheels 15 at their lower ends. Their wheels travel in grooves in tracks 16 which are set in the floor of the car. In order to prevent the tipping of the seat sections, the rails 16 are provided with undercut portions 17, which are raised slightly above the floor, in the present instance. On the end frames are flanged plates 18, which extend into the undercut groove of the portions 17. The plates 18 are located between the two wheels of each end frame and are secured to the end frames by bolts, or other fastenings. Intermediate of the end of each seat section are supports 19 that have wheels 20, which roll upon flat rails 21, secured to the floor of the car. In order to lock the movable seat sections 8 and 8ª in the position in which they are adjusted, bolts 22 are provided, which enter openings 23 in the floor of the car. These bolts are mounted in bearings 24 and 25, secured to the rear portion of the end frames 14 of the seat. At the upper end of each bolt is a hand hold 26. Within the bearing 24 is a coiled spring 27. Above the spring is a washer 28, held in place by a pin on the bolt. This spring tends to raise the bolt. In order to lock the bolt in engagement with the floor, a sliding locking plate 29 is adapted to ways in the bearing 24 which is arranged to enter a notch 30 in the bolt, Fig. 6. When the plate is withdrawn, the spring raises the bolt 23 clear of the floor after which the seat section can be moved.

By the above described arrangement of the seats of the car, the movable longitudinal seat section at the forward end of the car can be moved away from the side of the car, as in Fig. 1, to provide a passageway 9 for passengers to pass back of the seat section to the rear portion of the car while giving free ingress and egress to those passengers occupying the forward portion of the car. Both classes of passengers on entering the car, pass the motorman's station and the conductor's station at the forward end of the car.

In a single end car, the seats can be fixed. The longitudinal seat at the forward end of the car can be located some distance from the side of the car to provide a longitudinal aisle, which communicates with the centre aisle at the rear of the car.

While the invention is described in connection with a passenger car of the trolley type, it will be understood that it can be used on any car having an entrance and exit at one or both ends.

I claim:

1. The combination in a passenger car, of seat sections at each end thereof forming aisles between opposite seat sections, one of said seat sections at the forward end of the car being arranged some distance from the side of the car to form an additional longitudinal aisle.

2. The combination in a passenger car, of a longitudinal seat section; and transverse rails for the seat section, so that said seat section can be moved from the side of the car to form a passageway back of the seat section.

3. The combination in a passenger car, of permanent seats at each end of the car and at opposite sides thereof; movable longitudinal seat sections opposite the permanent seats; and transverse guides for the movable seat sections so that one of said movable seat sections can be moved from the sides of the car to provide a passageway.

4. The combination in a passenger car, of a series of transverse seat sections at each end of the car and at opposite sides thereof; and longitudinal seat sections opposite the transverse seat sections, said longitudinal seat sections being movable from the sides of the car, so as to provide a passage way at the back of one movable seat section for passengers passing to the opposite end of the car.

5. The combination in a passenger car, of permanent seats at each end of the car and at opposite sides thereof; movable longitudinal seat sections opposite the permanent seats; transverse rails in the floor of the car, said longitudinal seat sections having wheels arranged to travel on the rails; and means for preventing the tipping of the seat sections.

6. The combination in a passenger car having entrance and exit passageways at each end, of a series of transverse seats at each end of the car on the sides opposite the entrance and exit openings; and longitudinal seat sections opposite the transverse seats, said longitudinal seat sections being movable so that the seat at the entrance end of the car can be moved away from the side of the car to form a passageway back of said section to the rear of the car.

7. The combination in a passenger car, of longitudinal seat sections having rollers; grooved rails in the floor of the car on which the rollers travel, said rails having overhanging portions; and flanged plates on the seat sections extending under the overhanging portion to prevent the seat section tipping.

8. The combination in a passenger car, of a movable longitudinal seat section; guides for said section; means for preventing the seat tipping; and a bolt for holding the seat section in the position in which it is adjusted.

GEORGE FREY